J. H. BARTLETT.
MACHINE FOR MAKING PAPER BAGS.
APPLICATION FILED MAR. 6, 1913. RENEWED AUG. 5, 1916.

1,218,356.

Patented Mar. 6, 1917.
7 SHEETS—SHEET 2.

WITNESS

INVENTOR
ATTORNEYS

J. H. BARTLETT.
MACHINE FOR MAKING PAPER BAGS.
APPLICATION FILED MAR. 6, 1913. RENEWED AUG. 5, 1916.
1,218,356.
Patented Mar. 6, 1917.
7 SHEETS—SHEET 3.
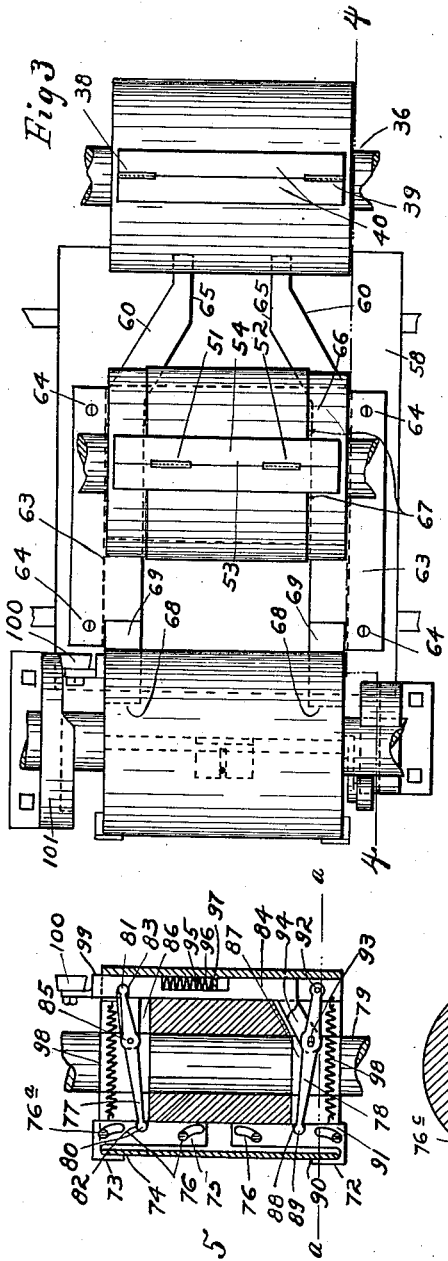

J. H. BARTLETT.
MACHINE FOR MAKING PAPER BAGS.
APPLICATION FILED MAR. 6, 1913. RENEWED AUG. 5, 1916.

1,218,356.

Patented Mar. 6, 1917.
7 SHEETS—SHEET 4.

J. H. BARTLETT.
MACHINE FOR MAKING PAPER BAGS.
APPLICATION FILED MAR. 6, 1913. RENEWED AUG. 5, 1916.

1,218,356.

Patented Mar. 6, 1917.
7 SHEETS—SHEET 5.

WITNESS

INVENTOR

ATTORNEYS

J. H. BARTLETT.
MACHINE FOR MAKING PAPER BAGS.
APPLICATION FILED MAR. 6, 1913. RENEWED AUG. 5, 1916.

1,218,356.

Patented Mar. 6, 1917.
7 SHEETS—SHEET 6.

WITNESS

INVENTOR
John H. Bartlett
Stewart & Stewart
ATTORNEYS

J. H. BARTLETT.
MACHINE FOR MAKING PAPER BAGS.
APPLICATION FILED MAR. 6, 1913. RENEWED AUG. 5, 1916.

1,218,356.

Patented Mar. 6, 1917.
7 SHEETS—SHEET 7.

UNITED STATES PATENT OFFICE.

JOHN H. BARTLETT, OF BALTIMORE, MARYLAND, ASSIGNOR TO COLUMBIA PAPER BAG COMPANY, OF BALTIMORE, MARYLAND, A CORPORATION OF MARYLAND.

MACHINE FOR MAKING PAPER BAGS.

1,218,356.   Specification of Letters Patent.   Patented Mar. 6, 1917.

Application filed March 6, 1913, Serial No. 752,366. Renewed August 5, 1916. Serial No. 113,384.

*To all whom it may concern:*

Be it known that I, JOHN H. BARTLETT, a citizen of the United States of America, residing at city of Baltimore, State of Maryland, have invented certain new and useful Improvements in Machines for Making Paper Bags, of which the following is a specification.

This invention relates to machines for making bags of paper or similar material and particularly to machines of the type which operate on bellows-fold tube to form flat and, preferably, square-bottom bags, and to a method of cutting continuous tube into bag lengths as it is fed to the machine.

Though the machine to which my invention has been applied embodies means for holding a web of paper to form a continuous tube, some features of my invention are equally applicable to other machines which receive the tube ready-formed and cut and fold it to complete the bag. Other features of my invention may be used in connection with machines which operate on paper previously cut, as on a different machine, into blanks each of a size and shape to form a single bag.

Described in general terms, the machine to which my invention has been applied and in connection with which it has been used and tested, and is herein shown, embodies means for feeding a continuous flat web, a cutter which is actuated to make a series of transverse cuts in the center of the flat web, one for each bag, suitable means for applying paste to one edge of the web, and the usual means for turning the edges of the web upward to form the paper into a bellows-fold tube as it advances. Other elements of my machine to which my invention more closely relates are the cutters which operate upon the folded tube to cut it into bag lengths as it advances and the different combinations of parts whereby the tube is opened at the severed portion and folded, preferably, first, into what is termed in the art "a diamond fold", and this latter is finally converted into a square bottom.

More particularly described, the members to which I have referred as operating upon the tube consist in slotting or slitting cutters which produce four longitudinal cuts, two on each side of the central transverse cut in the web. The two cuts at each side are registering cuts, but as they come over the bellows-fold and the latter is not pierced, they are made from opposite sides of the web, that is, from above and below, so that it is necessary to have two slotting cutters above and two slotting cutters below the web at this point. The slotting cutters are mounted to rotate, two upon a horizontal transverse shaft above the web, and two upon a horizontal transverse shaft below the web. It is, of course, understood that in the neighborhood of these cutters and in advance of them are the usual guides and supports for the moving tube, and a pair of horizontal transverse rolls in advance of the cutters serves to maintain the tension of the tube and give it the necessary forward motion to which I have referred as the feed. In advance of the tension or feed rolls, preferably in the same horizontal plane and having their axes parallel thereto, are two pairs of cutter rolls. A roll of the first or rearmost pair, preferably the upper, is provided with two short transverse cutters, one at each end of the roll, the two being in the same radial plane or element of the cylinder which forms the roll. Of the pair of rolls next forward, one, either the upper or the lower, preferably the upper, is provided with two cutters, also each in the same radial plane and one on each side of the center; but these cutters, instead of being at the ends of the rolls, extend each from a point opposite the inner end of the corresponding cutter on the roll next to the rear to a point opposite the corresponding end of the central transverse cutter first described which acts on the flat web. The cutters on these two pairs of rolls are preferably so placed on the periphery of the rolls and the rolls are so geared that the transverse cuts made in the web by the two sets of cutters form a continuous line from the ends of the central cuts to the edges of the web, leaving uncut the central portion of the web opposite the first cut.

In the practice of my process of cutting, I first make a short transverse cut in the center of the web, then fold it into a bellows-fold tube, then make four longitudinal slits, two adjacent each end of the transverse cut, then cut the edges transversely, then cut transversely through the intermediate portion between the edge cuts and the central portion, the edge cuts and intermediate cuts being preferably continuous on each side and intersecting the longitudinal cuts. This leaves uncut the center of the top side of the tube over the first transverse cut composed of the overlapped edges of the web, thus preserving the strongest part of the tube to resist the necessary tension stress in feeding and opening. This is severed, as hereinafter described, after the formation of the diamond fold. In this way, I am enabled to support the paper most efficiently and draw it forward and present it to the opener roll with the least possible loss by tearing, etc. Immediately after the portion next to the center has been severed, the blank, drawn forward by the previous bag to which it is connected by the central uncut portion of the top of the web, is presented to the opener rolls. Of these, the lower is provided with a central gripper and two side grippers, and the upper with a displacing pin and two side grippers. Each side gripper is mounted to move in a path which at its outer end is parallel to the roll surface and at its inner end is inclined toward the same. The grippers are actuated by cam-controlled levers, so proportioned that the cam motion is multiplied and the grippers move faster than the cam follower. The grippers thus avoid the edges of the paper and have a clean, quick action, making it possible to run at high speed.

The pin is so placed that it registers with a point on the lower roll slightly in the rear of the center gripper. It pierces the uncut central portion of the upper side of the web and engaging the central lower portion between the longitudinal slits and just in the rear of the transverse central cut, serves to press it into engagement with the center gripper. From the opener rolls, the bags are led upward, as will be hereinafter described, and the uncut central portion of the upper side of the web which connects the bag, the bottom of which is now being opened, to the previous bag, serves to draw the upper side of the tube, particularly its center, tightly over and hold it in contact with the surface of the upper opener roll. The opener rolls rotate oppositely and the centers of the cut edges of the bottom are drawn apart. The edges of the bellows-fold have been separated by means to be described, and at this point side grippers at each side of each roll engage the corresponding edges of the bellows-fold. The grippers of each roll, when engaging the paper, move toward the edges of the tube in a path which is in a radial plane of the roll and is in part parallel to and, at its inner end inclined toward, the surface of the roll as it approaches the longitudinal center of the roll. As the rolls continue to rotate, the tube is fed forward longitudinally, and the grippers move apart; the bellows-fold is distended so that the sides of the tube between and in advance of the grippers become almost flat, extending forward from the faces of the opener rolls. The opened end of the tube from which the bottom of the bag is to be formed now resembles a box with its bottom vertical and resting against the opener rolls, the opening of the box forwardly disposed. At this period of the operation, the center of the top side of the tube is being drawn upward over the top roll by the preceding bag and the center of the bottom side of the tube is being drawn downward by the center gripper of the lower roll. It will be understood that the longitudinal cuts which have been made in the material, extending to the rear from the transverse cuts, form central strips of paper which are held flat against the upper and lower rolls, as just described. To prevent tearing at the ends of the longitudinal cuts or slits and to form the ends of the inclined creases of the well-known diamond fold, four defining and supporting fingers have been provided. These are mounted on horizontal oppositely and continuously rotating shafts, extending transversely of the direction of the feed in front of the opener rolls. Extending radially of the transverse shaft are rock shafts which carry the fingers. Each of these rock shafts is provided at its extremity with a cam follower or dog arm which engages a stationary cam or dog. This serves to give an intermittent oscillating motion to the fingers as they revolve continuously about the center of the transverse shafts. One of the fingers is brought into engagement from the inside of the box with each corner, supporting the paper adjacent the end of each longitudinal slit to prevent its tearing and, at the same time, defining a crease at each such point which extends to the outer bellows crease where the paper is gripped by the corresponding side gripper. The defining fingers are moved by the rotation of their respective transverse shafts, the two engaging the upper corners moving upward and the two engaging the lower corners moving downward. While the fingers are in engagement with the paper, the followers, one on each rock shaft, are in engagement with the stationary cams in the path of rotation and the movement of the fingers is so controlled that the creases are defined, the paper supported and then, as the paper moves upward in the course of rotation, the fingers are withdrawn inwardly toward the transverse center of the tube so that they may move on in their path of rotation without touching the paper. While the fingers are in contact with the corners, shutters which swing about vertical axes turn the sides of the box inward, and as the fingers move out of contact, the sides are pressed flat, forming the well-known diamond fold. As the fingers move out of contact, the lower gripper and side grippers are released and the bag, drawn by the uncut central portion which connects it to the bag next ahead, moves up into the bite of a series of rolls placed in pairs with their contact points above the forward elements of the opener rolls. These rolls carry a cutter to sever the uncut portion and a pasting device. As the bag moves upward, the diamond is tucked in a well-known manner and formed into a square bottom, completing the bag which is carried by any preferred type of conveyer to a suitable receptacle.

The accompanying drawings show sufficient of a machine for making bags to illustrate the operation of the various features of my invention.

Fig. 3 is an enlarged plan of the cutter and opener rolls.

Fig. 4 is a section on the line 4—4 of Figs. 3 and 6.

Fig. 5 is a horizontal central section of a gripper roll.

Fig. 5ª is a cross-section taken on the line a, a, Fig. 5.

Fig. 6 is an elevation of the central gripper cam, follower and lever, with the adjacent portion of the roll.

Fig. 7 is a vertical central transverse section through the lower gripper roll showing the center gripper.

Figure 9:
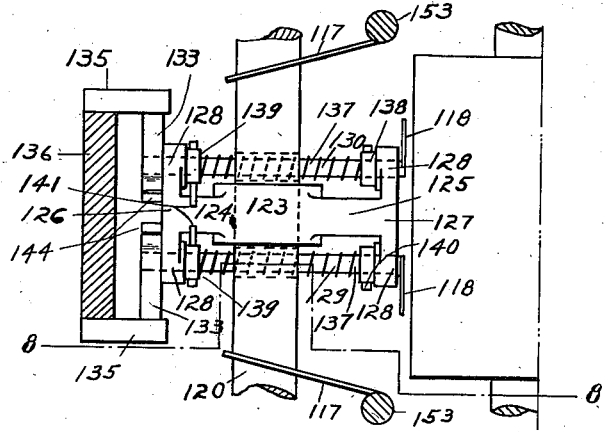
Figure 8:
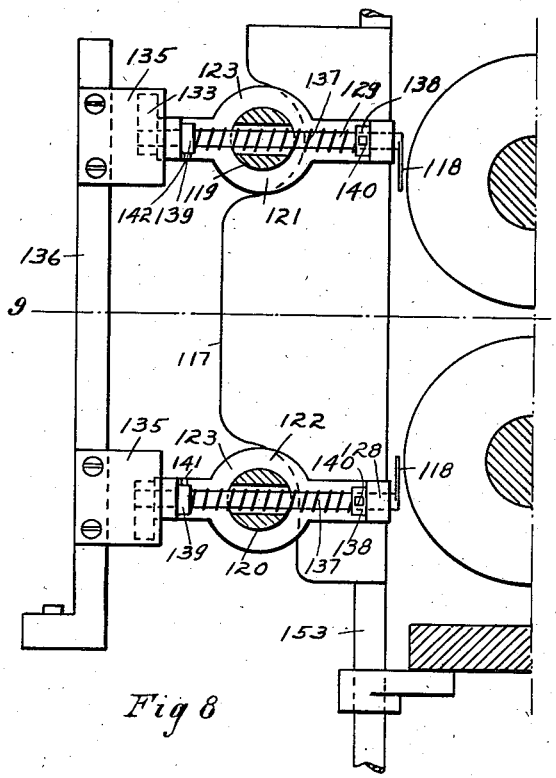

Fig. 8 is a vertical longitudinal section of the opener rolls and folding means, taken on the line 8—8 of Fig. 9.

Fig. 9 is a sectional plan of the opener rolls and follower mechanism, taken on the line 9—9 of Fig. 8.

Figure 10:
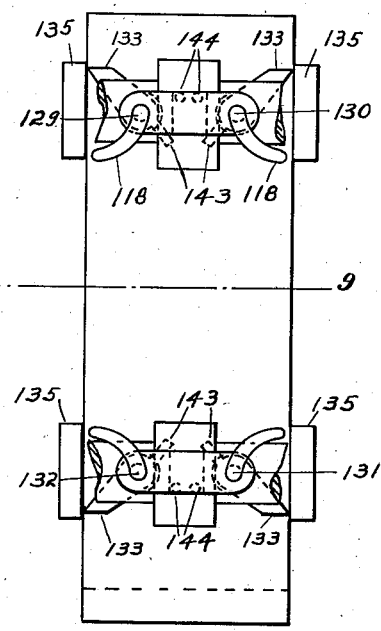

Fig. 10 is an elevation of the opener fingers and finger actuating mechanism, looking from the rear, i. e., from a point just in front of the opener rolls.

Figs. 11, 12, 13 and 14 are vertical sections on the line 8—8 of Fig. 9, showing the opening and folding mechanism and the paper tube at four different successive stages of the operation of opening the tube and forming the diamond fold.

Figs. 15, 16, 17 and 18 are corresponding fragmentary plan views showing the end of one opener roll and one shutter or wing in its relation thereto at the corresponding stages of the operation.

Figs. 19, 20, 21 and 22 are fragmentary front views showing the opening and folding mechanism and illustrating the corresponding successive stages of the operation of opening the bellows-fold tube and forming the diamond fold and drawing the folded paper upward to the final cutting and pasting operation.

Figure 19:
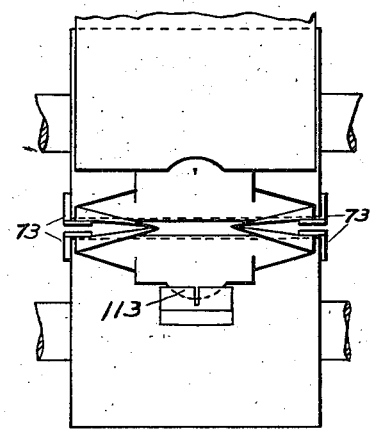
Figure 11:
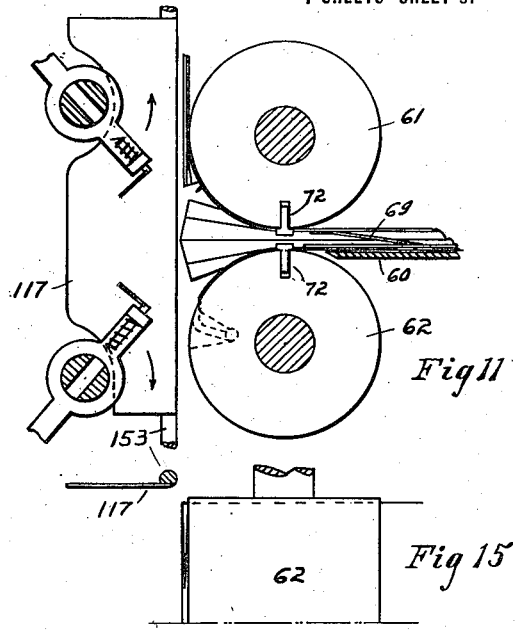
Figure 15:
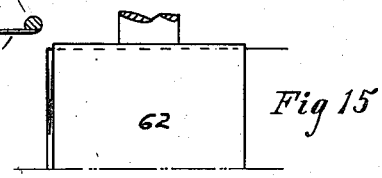
Figure 20:
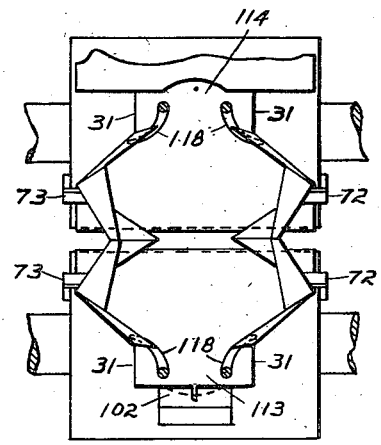
Figure 12:
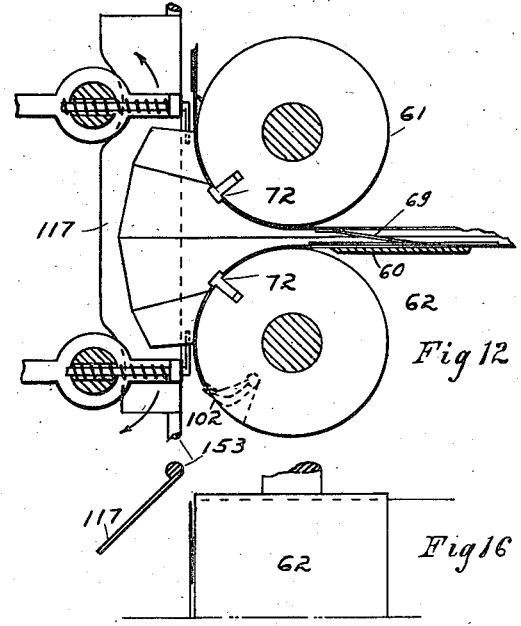
Figure 16:
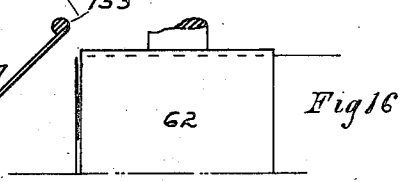
Figure 21:
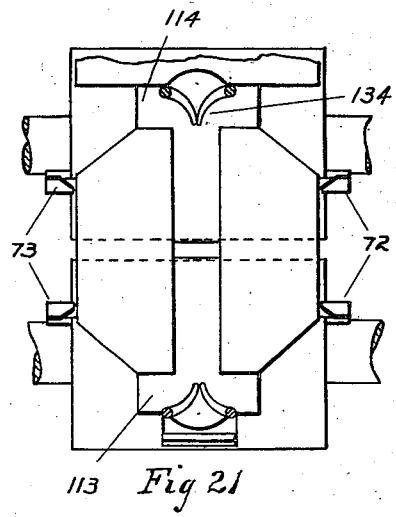
Figure 13:
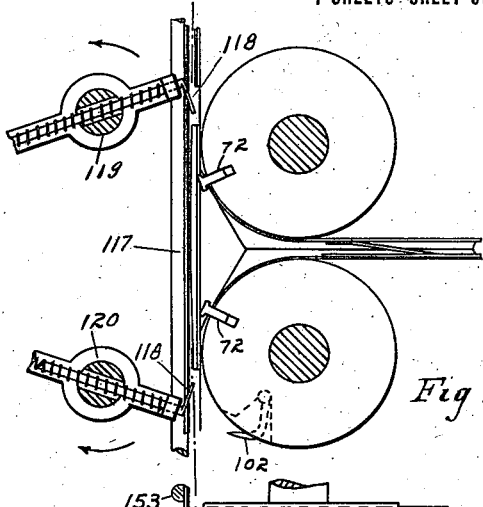
Figure 17:
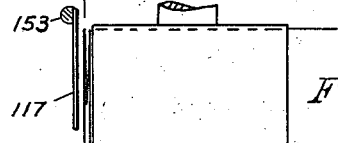
Figure 22:
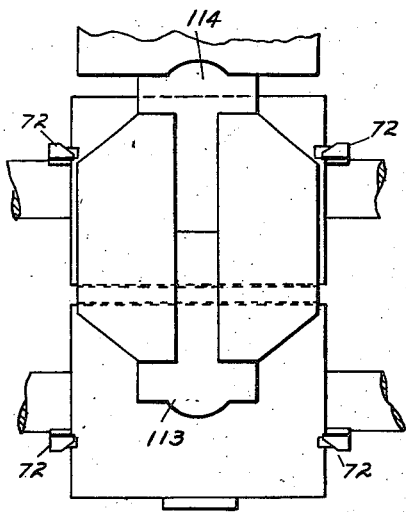
Figure 14:
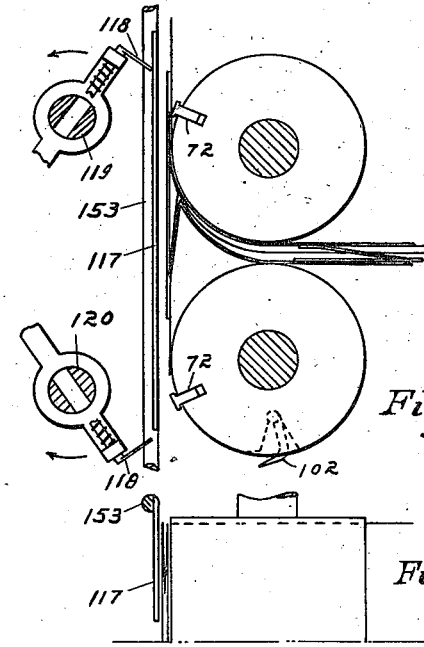
Figure 16:
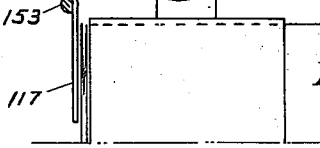

Figs. 11 to 22 correspond to each other in the relation in which they are placed; that is, Figs. 11, 15 and 19 show the elements of the machine and the paper upon which it is operating in one position soon after opening has commenced; Figs. 12, 16 and 20 in the next succeeding position; Figs. 13, 17 and 21 in the next, and Figs. 14, 18 and 22 in the next.

Figs. 23, 24, 25 and 26 are somewhat diagrammatic in nature and show the paper in different stages of the folding operation.

Figure 23:
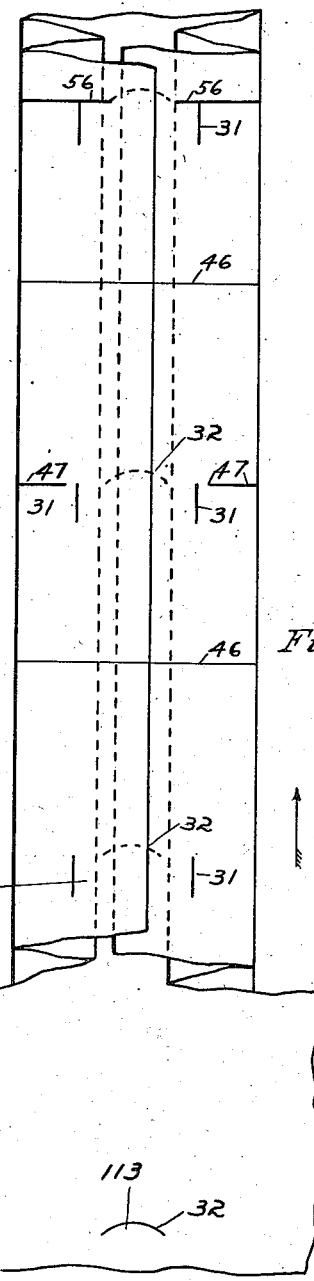

Fig. 23 shows a portion of the web, one end flat, the other end formed into a bellows-tube. The relation and order of the different cuts are illustrated.

Figure 24:
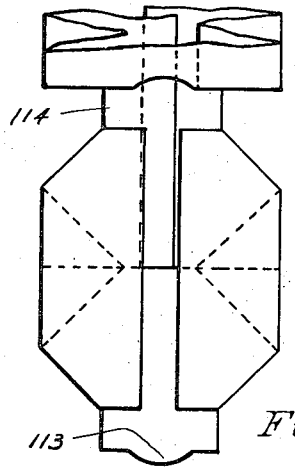

Fig. 24 shows the diamond fold completed, just prior to the last cutting operation.

Figure 25:
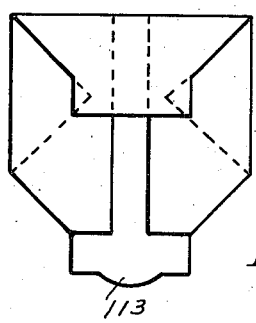

Fig. 25 shows the bottom of the bag severed from the next preceding bag and one side of the diamond folded over in the operation of forming the square bottom.

Figure 26:
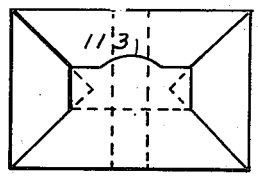

Fig. 26 shows the square bottom completed.

Figure 1:
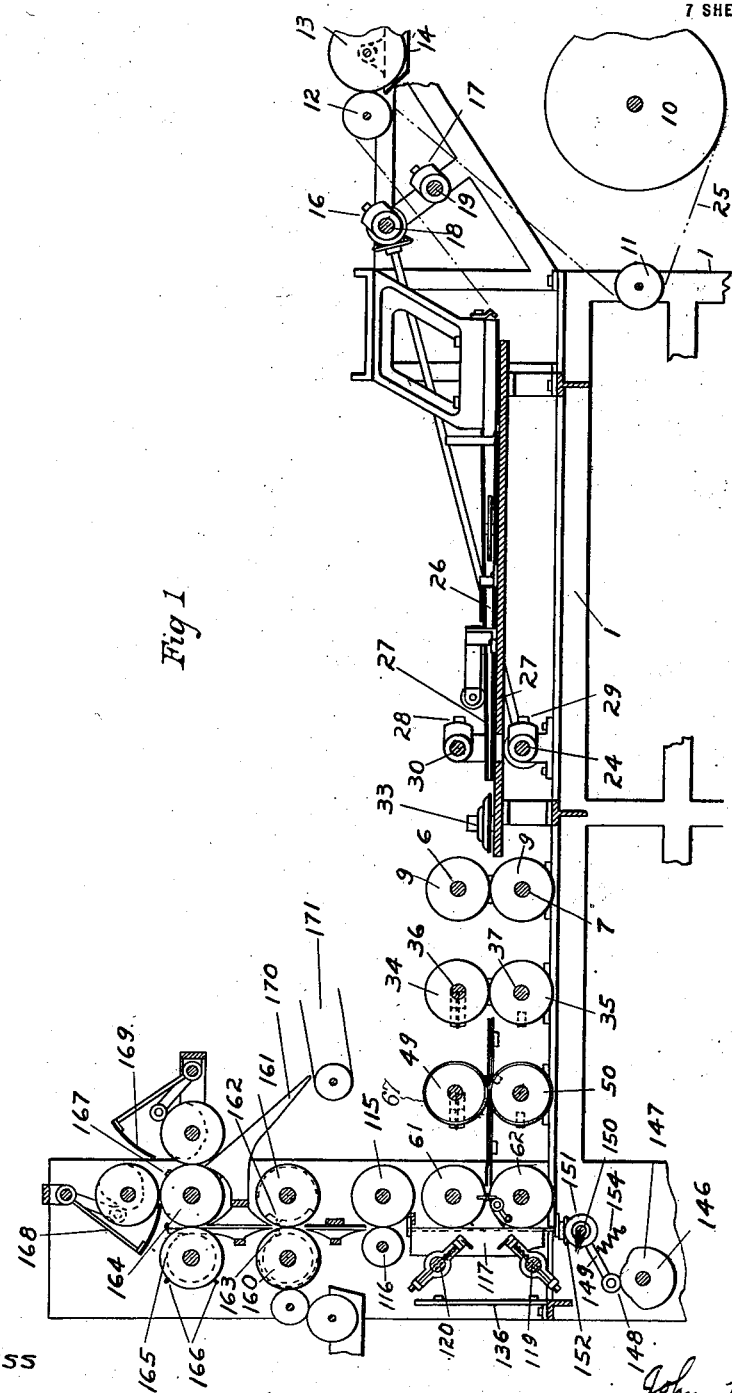
Figure 1 is a vertical longitudinal section of the machine taken on the line 1—1 of Fig. 2, certain portions of the machine being broken away for convenience in illustration.

Referring to the drawings, the frame proper of the machine is indicated by reference character 1. This frame carries the tube forming, cutting, opening, folding, pasting and tucking mechanism which together compose the machine embodying my invention. Power from any suitable source is applied to the machine by means of a belt 2 which engages a pulley 3 on the transverse shaft 4 which carries one of a train of toothed gears 5 which rotate the various feed rolls, cutter rolls, opener rolls, paste rolls and folding mechanism. Mounted on the transverse horizontal shafts 6 and 7, one over the other, which carry suitable gears 8 driven from the train 5, is a pair of tension rolls 9 which engage the paper, draw it forward through the forming mechanism to be hereinafter described and feed it to the cutter rolls. At the rear of the machine, mounted in suitable bearings, not shown, is a paper roll 10 which carries the supply of paper from which the machine is fed. The paper is in the form of a continuous flat web of width depending upon the size of the bags being made. These rolls are replaced from time to time as emptied. Just in advance of the paper roll and with its axis on substantially the same level, mounted to rotate freely on bearings in the frame of the machine, is a guide roll 11. Above the roll 10 is another guide roll 12 and coöperating therewith at one end of this roll is a paste roll 13 which dips its periphery into a paste receptacle 14. The paper 25, indicated by a dot-and-dash line in Fig. 1, is led from 13( the under side of the roll 10, forward under the guide roll 11, upward to the rear around the guide roll 12, where one edge is engaged by the paste roll 13. The paper passes over the guide roll 12, forward and down at an angle of about 45° to the tube-forming mechanism. Between the roll 12 and the entrance to the forming mechanism, the paper is engaged by a cutter 16. This is mounted on the transverse shaft 18 and a coöperating block 17 which supports the paper while being cut is mounted on the shaft 19 parallel to the shaft 18. The two shafts are geared together at 20 to rotate simultaneously in opposite directions. The cutter shaft 18 is driven by means of miter gears 21 from the transmission shaft 22 which, in turn, is driven by miter gears 23 from the transverse cutter shaft 24 which carries one of the gears of the train 5. The cutter 16 is curved forward centrally, is so placed that it engages the center portion of the web, and is so timed as to make one transverse cut 32 (see Fig. 23) for each bag length.

The tube-forming mechanism, indicated in a general way by reference character 26, is of a well-known type and need not be specifically described. It consists of stationary guides and rollers by which the outer edges of the paper are folded up and over and the web is formed into a bellows-fold tube as it advances. As previously stated, the paper is drawn by the tension rolls 9 from the paper roll 10, around the guide roll 11, over the guide roll 12, past the paste roll 13, the cutter 16, and through the tube former 26. These rolls, in addition to serving as tension rolls, press the pasted edge against the opposite edge of the web, closing and perfecting the joint.

Just to the rear of the rotating bellows guides 33 which are immediately back of the tension rolls 9, two above and two below the forward portions of the horizontal guide plates 27, one of which occupies the upper and the other the lower fold of the bellows, are rotating longitudinal slitting or slotting cutters, 28 above and 29 below. These are mounted, two upon the transverse horizontal shaft 24 below, and two upon the parallel shaft 30 above the guide plates 27, and the shaft 30 is geared to the shaft 24 to rotate simultaneously therewith and oppositely thereto. These cutters are so placed that they act together to form four longitudinal slits 31 (see Fig. 23) in the tube, two on each side of the center, and spaced therefrom a sufficient distance to leave, after the other operations, a central tab and a tension member, or neck, to be hereinafter described, the latter of sufficient strength to draw the bag being formed forward through the machine. These cuts extend backward a short distance, three-quarters of an inch to an inch, from points transversely opposite the ends of the transverse cut 32 first made. Of the two cuts on each side of the center, one is directly over the other, but these cuts are also opposite; i. e., one is over and the other is under the central fold of the bellows which, at this point, is between the imperforate guide plates 27, and for this reason the registering cuts cannot be made by means of a single cutter, so that four cutters of this type, in all, instead of two, are necessary. The slotting or slitting cutters are so timed as to operate once on each bag length.

Spaced a few inches in advance of the tension rolls 9 is a pair of cutter rolls 34, 35, mounted on horizontal shafts 36, 37, extending transversely to the direction of the feed, geared together to rotate oppositely to each other at a uniform surface speed which is the same as the surface speed of the tension rolls. The upper roll 34 is provided with two edge cutters 38, 39, rigidly mounted both in the same plane, extending radially of the roll and placed one at each end of the roll and extending from a point near the end face of the roll inward a short distance, preferably about an inch when medium sized bags are to be made. Within the scope of my invention, the end cutters may be variously placed, on either roll, or one on each roll. Mounted on each side of the cutters and extending the length of the roll are holding and clearing blocks 40 supported by suitable springs 41. The springs tend to maintain the blocks in normal position with their outer surfaces in the circumferential plane of the edges of the cutters and permit the clearing and holding blocks to yield inward radially under moderate pressure. The lower roll 35 carries a cutter block 42, preferably of a compressible material. This may be notched at 43 to receive the cutter edges. The direction of rotation of the cutter rolls 34 and 35 is such that their adjacent faces and, particularly the cutters and cutter block, when in contact, move forward in the direction of the feed. The edge cutters 38 and 39 and the cutter blocks 42 are so placed that the cutters make a cut 47, severing each edge of the tube opposite each transverse cut 32. As the cutters approach operative position, the paper is engaged between the holding and clearing blocks 40 and the cutter blocks 42 and held taut over the notch 43 and, at the proper moment, the knife enters the slot 43, severing the edges. In this way, the cuts are caused to be uniform, regular and accurately placed. As the rolls continue to rotate, the blocks 40 are released, move outward radially and clear the paper from the knives. In addition to the edge cutters 38 and 39, the roll 34 carries a creasing blade 44 and the roll 35 carries a corresponding block 45, preferably of yielding material, and having a longitudinal groove 48 extending across the roll. These members are placed about 90° behind the cutting members and serve to crease the tube transversely on the line 46 on which it is opened to form the bottom.

Just in advance of the cutting rolls 34 and 35 is a second pair of cutting rolls 49 and 50. These rolls are in most respects similar to the rolls 34 and 35 and similarly driven. The upper roll 49 is provided with two cutters or blades, 51 and 52, hereinafter termed transverse intermediate cutters, mounted in a similar manner to the end cutters 38 and 39, but placed nearer the longitudinal center of the roll. The intermediate cutters 51 and 52 are preferably so placed that the cutter 51 extends inward from a point longitudinally opposite the inner end of the edge cutter 38 to a point likewise opposite the outer end of the transverse cutter 16, and the cutter 52 is similarly placed in regard to the edge cutter 39 and the corresponding end of the transverse cutter 16. The cutters 51 and 52 are mounted between yielding holding and clearing blocks 53 and 54, similar to the blocks 40, and the roll 50 is provided with a cutter block 55, preferably of compressible material, and notched or grooved longitudinally to receive the cutters 51 and 52. This occurs once in each revolution, as in the case of the cutters 38 and 39 and the blocks 42. It will be apparent that each intermediate cutter, 51 or 52, makes at each revolution a transverse cut 56 extending inward from the inner end of one transverse edge cut 47 to the corresponding edge of the transverse center cut 32.

Extending forward from a point just in advance of the edge cutter rolls, 34 and 35, placed just below the plane of the feed, is a flat table or support 58 for the tube which is being cut. This table is of a width greater than the length of the rolls and extends forward to a point well between the opener rolls 61 and 62 to be described, and terminates just in the rear of a point between the centers of these rolls. The table 58 is apertured at 59 near its center surrounding the opposing faces of the intermediate cutter rolls 49 and 50, and the aperture is of sufficient size to permit free action of the rolls and passage of the paper. In the horizontal plane of the bite or contact points of the two pairs of cutter rolls are bellows guide and opener plates 60. These plates, as shown, extend from a point under the forward elements of the edge cutter rolls 34 and 35 to a point just to the rear of the line of centers of the opener rolls 61 and 62. The plates 60 are supported in a horizontal position upon the table 58 and spaced above the same by a slight interval which brings them to the level referred to as the plane of the bite of the rolls. The spacing is produced by a thin block or a portion of the plate of increased thickness, shown at 63 in Fig. 3 in dotted lines. Screws 64 serve to attach the plates to the table. The inner edges of the rear ends of the guide plates at 65 occupy the inner edges of the bellows folds and are parallel for a short distance. From this point, they are inclined outward, each away from the longitudinal centers of the rolls to a point 66 just outside the outer ends of the intermediate cutters. This point is just in advance of the rear of the intermediate cutter rolls. From here, the inner edges of the plate extend forward for a short distance parallel to the direction of the feed. The rolls 49 are cut away or shouldered at 67 to accommodate the plates 60, and from a point immediately forward of the bite the guide plates extend forward in the direction of the feed to their forward extremities 68. Near the forward ends of the guide plates 60, inclined forward and upward to a point above and slightly beyond the ends of the plates are leaf springs 69 which serve as bellows-fold openers. The operation of these will be apparent.

It will be understood that the function of the bellows-fold guide and supporting plates is to support and guide the paper from the time the transverse edge cuts are made until it is delivered to the grippers on the opener rolls. The contour of the bellows-guide plates, as described, is such that while the paper is being cut, it is effectively supported and guided; at the same time, the guide is comparatively remote from the cutting point and tearing of the paper during cutting is avoided. The guides or supports operate to support the paper, first, just beyond the edge cuts 47 on the inner side while the edge cuts are being made, and, then, just beyond the intermediate transverse cuts 56 and outside of them while these latter cuts are being made. From the intermediate cutter rolls 49 and 50, the bellows guides 60 extend forward to the opener rolls 61 and 62, and serve to support the tube which is now entirely severed except for the central uncut portion on the upper side of the tube, until engaged by the grippers on the opener rolls. The opener spring 69 serves to open the bellows-fold for engagement by the grippers on the opener rolls.

Figure 2:
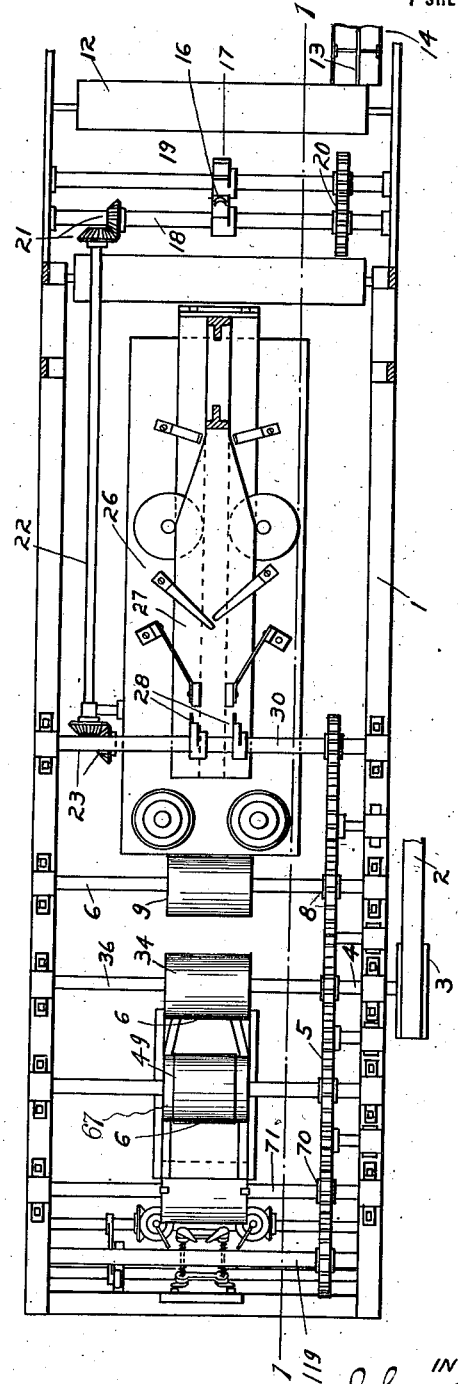
Fig. 2 is a top plan of the machine, certain of the over-lying parts being removed for convenience of illustration.

The opener rolls 61 and 62 (see particularly Figs. 1, 2, 3 and 4) are mounted in suitable bearings in the frame of the machine to rotate about horizontal axes extending transversely of the feed. In view of the fact that other opening means, which are for some purposes equivalent, are frequently used in bag machines instead of opener rolls, I have hereinafter occasionally used the broader term, support, to designate the rolls or equivalent members. The rolls are shown geared together to rotate in opposite directions at a uniform surface speed, equal to that of the tension and cutter rolls. A gear 70 of the train 5, mounted on the shaft 71 of one opener roll, drives these rolls, as will be understood from Fig. 2. As seen by examination of Fig. 4, the upper opener roll 61 is spaced an appreciable distance above the lower roll 62 and the top of the latter is shown as in the plane of the feed. These rolls do not bite or engage the paper between them, but merely serve to open the tube which is held by means of side and center grippers to be described. Each opener roll, 61 and 62, in the machine shown, is provided with two side grippers, 72 and 73. These are similar in the two rolls and the grippers of the upper roll 61 and the operating means therefor are clearly illustrated in Fig. 5 which is a horizontal central cross-section through that roll. Each gripper, 72 and 73, consists of jaws 74, 90, and sliding blocks 75, 91, with which the jaws are shown as integral. The blocks 75, 91, are seated in corresponding radial longitudinal slots opening in the end faces of the rolls so that they may slide in and out of the ends of the rolls longitudinally thereof. Each block is pierced by two slots 76 which are shown as curved and inclined away from the axis of the roll as they approach its ends and parallel to the axis of the roll at their inner ends. Each slot is engaged by a pin 76ª which is seated in the body of the roll and passes transversely through the block by way of the slots, so that as the blocks slide in and out of the ends of the rolls, i. e., move along the rolls, the gripper jaws, 74 and 90, will move in a path, the outer portion of which is parallel to and the inner end of which is inclined toward the face of the roll as the jaws approach the longitudinal center of the roll. As will be understood by an inspection of the drawings, while the sliding blocks are described as seated in slots in the rolls, they actually slide in a seat block 76ᵇ of U-shaped cross-section which is seated in a longitudinal slot in the roll face and held by screws 76ᶜ.

The motion of the sliding blocks is produced by means of levers, one for each block. These are designated by reference characters 77 and 78. The lever 77 is provided at each extremity with a ball or disk, 80, 81. The disk 80 rests loosely in a socket 82 in the sliding block 75 and the disk or ball 81 engages a similar socket 83 in a slide bar 84 mounted in the roll in a seat block 84ª similar to the seat block 76ᵇ, at a point substantially diametrically opposite the gripper blocks to move in a path parallel to the axis of the roll. At a point 85 between the disks or balls 80, 81, and preferably nearer the latter, the lever 77 is pivoted to a bracket secured to the seat block 84ª. The shaft 79 is slotted at 86 and 87 to provide for the passage therethrough of the levers 77 and 78. The lever 78 is provided at one extremity with a disk or ball 88 which engages a socket 89 in the block 91 carrying the gripper jaw 90. This lever passes through the slot 87 in the shaft 79 and is pivoted to the roll at a point 92 diametrically opposite the gripper. This lever is slotted at a point between its ends, preferably nearer the end 92, to receive a pin 93 mounted on the arm 94 of the sliding bar 84. The latter is recessed at 95 to receive a coil spring 96 which bears at one end against the extremity of the recess and at the opposite end against an abutment 97 on the roll which extends into the recess for this purpose. As shown, springs 98 extend diametrically across the roll, engaging at one end the sliding blocks 75 and 91 which carry the grippers and at the other end secured to the roll. The sliding bar 84 projects beyond the roll at 99 on the end adjacent the lever 77 and carries on its extremity a roller 100 adapted to engage and coöperate with the stationary cam 101 (see Fig. 3). The spring 96 tends to maintain the sliding bar 84 in the position in which it is shown, i. e., the position in which it extends farthest beyond the roll, and to press the roller 100 against the cam 101. The action of the spring 96, therefore, tends to rotate the lever 77 left-handed, whereby the block 75 is pressed inward and the pins occupy the outer ends of the slots 76 and the gripper is normally closed. While the tendency of the spring 96 is to rotate the lever 77 left-handed, it tends to rotate the lever 78 right-handed, and the sliding block 91 which it engages is drawn inward toward the center of the roll, the pins occupy the outer ends of the slots 76 in this block and the gripper 72 is also maintained normally closed. The springs 98 extend diametrically across the roll, one secured at its extremity to each gripper block and, also, tend to maintain the grippers closed. As the opener roll rotates, carrying with it the grippers, levers, sliding bar and the cam follower 100, the latter is moved over the cam 101 and at the proper period in its revolution comes in contact with the high part of the cam. The pressure of the cam on the roller moves the sliding bar 84 inward against the action of the spring. The lever 77 is swung in a right-handed rotation, and, simultaneously, the lever 78 is swung in a left-handed rotation, the gripper blocks are moved outward, the slotted portion moves over the pins until the pins occupy the inner ends of the slots. The grippers move away from the cylindrical surfaces of the rolls, as previously described, and then outward from the ends in a direction substantially parallel to the axis. As the roller passes from the high part of the cam, this action is reversed, due to the tension of the springs, and the grippers move inward until the jaws are radially opposite the cylindrical surfaces and then toward the cylindrical surfaces; that is, the grippers move over the paper, then directly against it, pressing it against the roll. The grippers land flat upon the surface of the paper, the ends of the jaws avoid the edges of the paper, or the edges of the bellows-fold, and injury to the latter is prevented. By placing the intermediate pivot 85 of the lever 77 nearer the sliding bar 84 than it is to the sliding gripper block, and by placing the pin 93 on the sliding bar nearer to the path of this bar than it is to the gripper block 91, the motion transmitted to the slide is multiplied, giving to the gripper jaws a quick action with an easy cam motion. The grippers moving quickly on the path described engage and release the paper positively without unnecessary or accidental contact. This makes it possible to run the machine at a high speed with little consequent loss at this point.

In addition to side grippers, 72 and 73, the lower opener roll 62 is provided with a center or face gripper 102. This gripper, or gripper jaw, is placed in the center of the axial length of the roll and is rigidly secured to or made integral with a rock shaft 103 journaled in the roll and extending longitudinally thereof. The rock shaft 103 is eccentrically placed in regard to the roll and the latter is cut away at 104 to permit oscillation of the gripper, the shank 105 of which extends outward substantially radially to a point near the surface of the roll when it is bent backward, i. e., in a direction opposite to that of the revolution of the roll, to form the gripper proper 102. Just outside of the end of the roll and extending at right angles to the rock shaft 103 is an arm 106 secured to the rock shaft and provided with a cam follower roll 107. The stationary cam 108, mounted on suitable brackets 109, coöperates with the follower 107 which is pressed against the cam by the action of the spring 110 to cause the lever 106 and, also, the shaft 103 to oscillate through the desired angle at the desired interval, determined by the shape of the cam. In this way, the central gripper or front gripper 102 is caused to open and close at predetermined times as the opener roll rotates. It will be noted that the spring 110 tends to maintain the gripper closed; the cam acts against the spring to open the gripper at the desired intervals.

The upper opener roll 61 is provided with a spur or pin 112 extending outward radially from the surface thereof and placed opposite the axial center. The pin 112 and center gripper 102 are so placed and the rolls are so geared that in the rotation of the rolls the pin pierces the top side of the tube just in the rear of the gripper and comes in contact with the tab or flap 113 (see Fig. 23) on the under side of the tube which is formed by the action of the center cutter 16 and the longitudinal cutters 29. The top of the tube is held taut and is pierced as described. The flap 113 being free is pressed downward and as the rolls continue to revolve the action of the cam 108 and roller 107 causes the gripper to engage the flap or tab 113. The tab or flap 113 lies directly beneath the uncut portion or neck 114 which connects the blank being operated upon with the next preceding bag which is being drawn upward by the tension rolls 115 and 116. The upward draft of the preceding bag causes the neck 114 to be drawn tightly over the surface of the upper opener roll 61 and the center gripper 102 holds the tab 113 tightly against the surface of the lower roll. The rolls are rotating in opposite directions, indicated by the arrows in Fig. 4, the forward surface of the upper roll moving upward, the forward surface of the lower roll moving downward, and the end of the tube is opened and drawn apart, as shown in Figs. 11 and 19. As has been previously described, the bellows-fold adjacent the line of centers of the gripper rolls is opened by means of the bellows guide 60 and the opener springs 69. These serve to hold the upper and lower edges of the bellows against the surfaces of the upper and lower opener rolls respectively, and when these rolls have revolved through an angle of about 45° from the point at which the center gripper 102 engaged the paper, the follower 100 reaches the low part of the cam 101 and the springs 96 and 98 act to close the side grippers 72 and 73 of both opener rolls. The paper is thus engaged at the edges of the bellows-folds, as shown in Figs. 11 and 19. The continued rotation of the rolls to the position shown in Figs. 12 and 20 opens the tube so that the end of the blank beyond the side grippers is spread out in a form resembling a box with its bottom placed against the front faces of the opener rolls. The neck 114 is drawn up and the tab 113 is drawn down. At this point, the folding members come into operation.

The folding mechanism consists of the shutters or wings 117 and the supporting and defining fingers 118 and the means for supporting and actuating these members. The supporting and defining fingers are carried, two by each of the parallel, horizontal, transverse shafts 119 and 120, known as the defining shafts, mounted one over the other, spaced a short distance in front of the opener rolls. These two shafts are geared together to rotate in opposite directions at the same speed and are driven uniformly in continuous rotation by a gear of the train mounted on one such shaft. Each defining shaft carries a support 121 on the upper shaft, and 122 on the lower shaft, rigidly secured thereto to rotate therewith. Each support consists of a boss 123 and two oppositely extending T-shaped radial arms 124 and 125, each having a cross arm 126, 127, at its extremity parallel to the defining shafts. Each end of the cross arm of each radial T-shaped arm is apertured at its outer extremity to form alined bearings 128 for rock shafts, 129 and 130 on the lower defining shaft, and 131 and 132 on the upper defining shaft. These rock shafts are radially placed in regard to the defining shafts, 119 and 120, and, as shown, extend a substantially equal distance on each side of the same. They are mounted, two on each support, one on each side of the boss engaging the two bearings 128 in the corresponding ends of the T-arms 126 and 127. The defining shafts 119 and 120 are apertured to allow the rock shafts to pass freely therethrough. The rock shafts are provided, each at one end, with a foot, cam follower or dog arm 133, and at the other end with a defining finger 118. The rotation of the defining shafts, 119, 120, imparts to the fingers and followers a motion of continuous revolution, each pair of rock shafts, fingers and followers moving with its defining shaft about the axis of the latter. In the path of revolution of each dog arm or follower 133 is a stationary cam or dog 135, mounted on a suitable bracket 136 in the frame of the machine. As shown, the single bracket 136 carries all four dogs or stationary cams 135 (see Figs. 8 and 10). Engagement of the cams by the revolving followers gives to each finger an intermittent oscillation which is combined with its motion of continuous revolution.

It will be noted that the two cams 135 for each pair of rock shafts 129 and 130, and 131 and 132, (a pair of rock shafts meaning the rock shafts mounted on a single defining shaft) are on the opposite and outer sides of the rock shafts, so that the latter pass between the two cams, and the cams rock, each shaft of each pair, in the opposite direction to that in which the other shaft of that pair is rocked. A coil spring 137 surrounds each rock shaft and is secured at each extremity to a collar, 138 at one end, and 139 at the other end. The former is non-rotatably secured to the shaft by means of a set screw 140, and the latter, 139, is mounted loosely on the shaft so that the shaft may rotate freely relatively to the collar. A pin, or other projection, 141, on the collar 139 engages the support, or rather the arm 124 thereof, and prevents rotation of the collar relatively to the support. As shown, the pins 141 of the lower rock shafts rest on the top of the arm 124 of the lower support, so that the springs 137 tend to rotate these rock shafts inward from above, and the pins 142 of the upper rock shafts rest on the lower side of the upper support 121, so that the springs tend to rotate the upper shafts inward from below. As shown, each rock shaft is provided with a stop pin 143 extending in a direction substantially opposite to that of the follower and made integral with the rear end thereof. The stop pins 143 coöperate with the stop 144 on the supports, and it will be apparent that each rock shaft is normally held by its spring in such position that the pin 143 rests against the stop 144 and that it is moved from this position by the engagement of its follower 133 with the corresponding cam 135. Each rock shaft, 129, 130, and 131, 132, is provided with a defining and supporting finger 118 placed at the end opposite to its cam follower 133 and bent at right angles to the shaft.

In the machine shown, each defining finger 118 stands substantially at right angles to the follower or dog arm 133. Each of these fingers is curved backward, contrary to the tendency of rotation imparted by the spiral spring on its rock shaft, and in their normal position, i. e., relatively to the support, both fingers of each pair are turned inward, as shown in Fig. 21. As previously stated, the defining shafts rotate continuously, at equal speed, in opposite directions, that is, the upper shaft 119 rotates from below toward the opener rolls, and the lower shaft 120 rotates from above toward the opener rolls. The dog arms or cam followers 133 normally, i. e., when the stop pins 143 are in contact with the stops 144, project outward on opposite sides of the rock shafts and when they come in contact with the stationary cams or dogs 135, which occurs when the rock shaft is substantially horizontal, the fingers are swung outward through an angle of about 90°. It will be noted that at this time the upper followers are moving downward and the lower followers are moving upward, and the reverse is true of the fingers, that is, the upper fingers are moving upward and the lower fingers are moving downward. As the dog arms or cam followers 133 clear the dogs or stationary cams 135, the rock shafts are released and the springs 137 rotate them backward to normal position and the fingers of each pair move together.

The shutters or wings 117 are actuated by means of a cam 147 mounted upon a continuously rotating horizontal transverse shaft 146 (see Fig. 1). This cam is engaged by a follower 148 mounted on the arm 149 of another horizontal transverse shaft 150 on which are mounted two bevel gears 151 which engage two similar bevel gears 152. Two vertical wing shafts 153, one at each side of the opener rolls and spaced a slight distance in advance of the same, carry bevel gears 152, one being secured to each shaft. The folder wings 117 are secured, each at its outer edge, to one of the shafts 153, the wing plate extending tangentially of the shaft. The wings 117 are so placed that when swung into position with their edges adjacent, they are tangent to their shafts on their rear side, i. e., on the side next to the rolls. The operation of the wings is quite obvious. When the high part of the cam 147 is in contact with the roller 148, the latter is raised and the wings are held open. When in the course of the rotation of the shaft 146, the lower part of the cam 147 comes under the follower, the spring 154 swings the arm 149 downward, which motion is communicated to the folder wings 117 through the shaft 150, the gears 151 and 152 and the shaft 153, and causes them to swing backward into a transverse plane with their edges juxtaposed (see Figs. 17 and 18). In this position, the plates are parallel to the front faces of the opener rolls 61 and 62 and in close relation thereto, although not immediately in contact therewith (see Figs. 13, 14, 17 and 18).

The operation of the opening mechanism, consisting of the opener rolls 61 and 62, the side grippers 72 and 73, the front gripper 102, etc., has already been described down to the period of the operation illustrated in Figs. 12, 16 and 20. These views show the position of the paper a very small fraction of a second before the release of the grippers 72; therefore, a very short time before the paper of the bellows-fold between these grippers has been drawn taut. At this time, the upper pair of fingers 118 is moving upward and the lower pair moving downward, each pair, of course, revolving about the center of its respective defining shaft. At this time, the rock shafts 129, 130, and 131, 132 are substantially horizontal, as shown in Fig. 12 (see also Figs. 8, 9 and 10) and the dog arms or cam followers 133 have come in contact with the edges of the dogs or cams 135, whereby the rock shafts have been rotated through an angle of about 90° about their centers from their normal positions in which the stop pins 143 are in contact with the stops 144, and the outer points of these dog arms now rest on the inwardly disposed or acting faces of the cams or dogs 135 near the upper edges of the upper dogs or cams and the lower edges of the lower dogs or cams, so that during the next few degrees of revolution of the defining shafts 119 and 120, the rock shafts 129 to 132 will be fixed relatively to the defining shafts; i. e., they will have no motion of oscillation about their axes. This is for the reason that the cam surfaces of the cams or dogs 135, engaged by the followers 133, are flat and vertical, though they may be of different contour to give the fingers any desired motion, within the scope of my invention. At this time, the fingers 118 touch lightly but are not pressed against the paper, the upper fingers just below, the lower fingers just above the closed or rear ends of the longitudinal slits 31. The area of free paper beyond these fingers and beyond the grippers 72 and 73, except for the neck 114 and the tab 113 which are held tightly against the rolls, projects forward substantially at right angles to the plane of the front faces of the opener rolls. At this time, the upper fingers 118 are moving upward and the lower fingers are moving downward in continuous revolution, each pair with its defining shaft, and, as has been described, the fingers are at this time fixed in regard to their defining shafts 119 and 120. The rolls 61 and 62 are also rotating oppositely, the speed of the fingers being the same as the speed of the rolls, the front face of the upper roll moving upward and the front face of the lower roll moving downward; i. e., the fingers and the adjacent faces of the rolls are moving in the same direction at the same speed. The end of the bag blank, shown as substantially open in Figs. 12, 16 and 20, is being drawn out vertically and the fingers 118 engage the paper adjacent ends of the slits 31, support it and define the converging creases, and, also, prevent tearing at this point.

When the roller 148 is on the high part of the cam 147, the folder wings or shutters 117 are at right angles to the opener rolls (see Fig. 15). In Figs. 12, 16 and 20, the roller is moved part way down the incline toward the low part of the cam and the folder wings stand at an angle of about 45° with the axes of the rolls and their adjacent cylindrical faces. As the parts move toward the position shown in Figs. 13, 17 and 21, the roller 148 reaches the low part of the cam 146 against which it is pressed by the spring 154, and the wings 117 close or swing into a plane parallel to the faces of the rolls with their swinging edges adjacent. In making this movement, the wings fold the free portion of the paper projecting forward from the faces of the rolls at right angles into a vertical plane transverse to the direction of the feed of the paper, forming at each side of the tube a vertical crease extending from the side grippers on one roll to the corresponding side grippers on the other roll. Four other creases extend, two from the tab 113 and two from the neck 114, to the adjacent side grippers, substantially at an angle of 45° to the vertical. The outer ends of these creases are determined by the side grippers and the inner ends, that is, the upper ends of the upper creases and the lower ends of the lower creases are defined by the defining and supporting fingers 118.

As the parts move to the position shown in Figs. 11, 15 and 19, the tension on the uncut central portion 114 and the tab 113 is increased as the bag bottom is drawn taut and the fingers 118 which move with the rolls serve to support the paper adjacent the ends of the slits to prevent tearing, as well as to define the ends of the diagonal creases.

As the parts approach the position shown in Figs. 13, 17 and 21, and the folder wings 117 swing inward, as described, the rotation of the defining shafts 119 and 120 moves the dog arms or followers 133 beyond the surface of the dogs or cams 135, so that the rock shafts are released and rotate to normal position, actuated by the springs, whereby the fingers of each pair are caused to approach each other, and rotation of the defining shaft withdraws them from the fold just as the wings 117 are closed, as previously described. At this time, the side grippers are also withdrawn, and the roller 107 of the center gripper 102 moves on to the high part of its cam and this gripper is opened. The paper is released from the opening mechanism and the tension or creasing rolls 115 and 116 draw it upward. As the bag blank passes through these rolls, it is pressed flat and the folds which have already been made become well-defined creases. The rolls 160 and 161, next above the rolls 115 and 116, carry paste applying mechanism of any suitable type. These devices are so well known that none need be described here. A cutter 162 on the roll 161 and a cutting block 163 on the roll 160 coöperate to sever the central uncut portion 114 and as the bag is fed on upward it comes between the rolls 164 and 165, carrying creasing blades 166 and creasing blocks 167. As the blank passes through these rolls, two transverse creases are formed across the diamond, after which the paper is tucked in by the tucker blades 168 and 169, folding the pasted surfaces upon each other, forming the diamond fold into a square bottom. The finished bag moves down the slide 170 to a conveyer 171 by which it is carried from the machine.

The operation of the machine and the method of cutting the tube have been carefully outlined in connection with the machine, and it is thought that they will be so clearly understood as to require no further description. While I have described in minute detail a preferred embodiment of my invention, I do not desire to limit my invention to the details described and shown.

What I claim and desire to secure by Letters Patent is:

1. In a machine for making square bottom bags, means for advancing the web, a central cutter having a blade extending transversely to the direction of the feed, means for actuating the same to make cuts at intervals in the web, means for forming the web into a bellows-fold tube, cutters having blades extending longitudinally of the web, means for actuating the same to produce four longitudinal cuts in the web, an edge cutter having two blades extending transversely of the tube, means for actuating this cutter to sever the edges of the tube, an intermediate cutter in advance of the edge cutter having two transverse blades, each extending inward from a point longitudinally opposite the inner end of one blade of the edge cutter to a point longitudinally opposite the nearest end of the central cutter, means for actuating this cutter, means for opening the cut portion of the tube to form a diamond fold, and means for converting the diamond folded portion into a square bottom.

2. In a machine for making square-bottom bags, having means for advancing the web, and the following members arranged from rear to front of the machine in the order named: a central cutter having a blade extending transversely to the direction of the feed, means for actuating the same to make cuts at intervals in the web, means for forming the web into a bellows-fold tube, cutters having blades extending longitudinally of the web, means for actuating the same to produce four longitudinal cuts in the web, an edge cutter having two blades extending transversely of the tube, means for actuating this cutter to sever the edges of the tube, a cutter in advance of the edge cutter having two transverse blades, each extending inward from a point longitudinally opposite the inner end of one blade of the edge cutter to a point longitudinally opposite the outer end of the central cutter, means for actuating this cutter, means for opening the cut portion of the tube to form a diamond fold, and means for converting the diamond folded portion into a square bottom.

3. In a machine for making square-bottom bags, means for advancing the web, a central cutter having a blade extending transversely to the direction of the feed, means for actuating the same to make cuts at intervals in the web, means for forming the web into a bellows-fold tube, cutters having blades extending longitudinally of the web, means for actuating the same to produce four longitudinal cuts in the web, an edge cutter having two blades extending transversely of the tube, means for actuating this cutter to sever the edges of the tube, an intermediate cutter in advance of the edge cutter having two transverse blades, each extending inward from a point longitudinally opposite the inner end of one blade of the edge cutter to a point longitudinally opposite the nearest end of the central cutter, means for actuating this cutter to sever the tube, leaving an uncut central portion opposite the first transverse cut, means for opening the cut portion of the tube to form a diamond fold, means for severing the uncut portion, and means for converting the diamond folded portion into a square bottom.

4. In a machine for making bags from a bellows fold tube, a pair of cutter rolls and means for supporting the paper on both sides of such rolls consisting of horizontal plates, one in each bellows-fold, the plates occupying the inner portion of the folds in the rear of the cutter rolls and the outer portion of the folds in front of the cutter rolls.

5. In a machine for making bellows-fold paper bags, a pair of cutter rolls, means for supporting the paper on both sides of such rolls consisting of horizontal plates, one in each bellows-fold, the plates occupying the inner portion of the folds in the rear of the cutter rolls and the outer portion of the folds in the front of the cutter rolls, the rolls being shouldered to accommodate the plates, and a bellows opener in the forward end of each plate.

6. In a machine for making bags from bellows-fold tube of paper or similar material, means for cutting the center of the tube transversely, means for advancing the tube, an edge cutter for severing the edges of the tube, an intermediate cutter spaced in advance of the edge cutter for severing the portions between the center and the edges, and means for supporting the tube during and after the latter two cutting operations, said means consisting of two flat horizontal plates engaging the inner edges of the bellows-fold just in advance of the edge cutter and engaging the outer portions of the tube adjacent the intermediate cutters.

7. In a machine for making bags from bellows-fold tube of paper or similar material, means for cutting the center of the tube transversely, means for advancing the tube, an edge cutter for severing the edges of the tube, an intermediate cutter spaced in advance of the edge cutter for severing the portion between the center and the edges, and means for supporting the tube from within the bellows-fold during and after the latter two cutting operations, said means consisting of two flat horizontal plates engaging the inner edges of the bellows-fold adjacent the edge cutter and engaging the outer portion of the bellows-fold adjacent the intermediate cutters.

8. In a machine for making bags from bellows-fold tube of paper or similar material, means for cutting the center of the tube transversely, means for advancing the tube, an edge cutter for severing the edges of the tube, an intermediate cutter spaced in advance of the edge cutter for severing the portion between the center and the edges, and means for supporting the tube from within the bellows-fold during and after the latter two cutting operations, said means consisting of two flat horizontal plates engaging the inner edges of the bellows-fold adjacent the edge cutter and engaging the outer portion of the bellows-fold on both sides of the intermediate cutter.

9. In a machine for making paper bags from bellows-fold tube, a pair of cutter rolls, means for supporting the paper adjacent and in advance of the rolls, consisting of two horizontal plates, one in each bellows-fold, the plates occupying the bellows-fold on both sides of the cutter rolls, oppositely moving openers, and means on the forward end of the supports for opening the bellows-fold.

10. In a machine for making paper bags from a bellows-fold tube, the machine having a support for the paper against which it is held while being folded, means for holding the edges of said bellows-fold comprising grippers, and means for actuating the grippers consisting of sliding rods carrying the grippers, each rod having a guiding slot therein, means on the support for engaging the slot and means tending to move the sliding rods in the direction of their length.

11. In a machine for making paper bags from a bellows-fold tube, the machine having a support for the paper against which it is held while being folded, means for holding the edges of said bellows-fold, comprising grippers, means for constraining the grippers to move in a path inclined toward the surface of the support as the lateral center of the support is approached, and means for actuating the grippers to move in such path, said means including sliding rods upon which the grippers are mounted, the rods having each a curved slot and means on the support to engage the slot.

12. In a machine for making paper bags from a bellows-fold tube, the machine having a support for the paper against which it is held while being folded, means for holding the edges of said bellows-fold, comprising grippers, means for constraining the grippers to move in a path, part of which is parallel to and the inner end of which is inclined toward the surface of the support, and means for actuating the grippers to move in such path.

13. In a machine for making paper bags from a bellows fold tube, the machine having a support for the paper against which it is held while being folded; means for holding the edges of the said bellows-fold, comprising grippers, means for constraining each gripper to move in a path inclined toward the surface of the support, and means for actuating the grippers to move in such path, comprising a sliding member, an intermediately pivoted lever engaging one jaw, a lever pivoted at its extremity engaging the other jaw, both levers connected to the sliding member, and means for actuating the sliding member to open and close the grippers simultaneously.

14. In a machine for making paper bags from a bellows-fold tube, the machine having a support for the paper against which it is held while being folded; means for holding the edges of the said bellows-fold, comprising grippers, means for constraining each gripper to move in a path, part of which is parallel to and the inner end of which is inclined toward the surface of the support, and means for actuating the grippers to move in such path, comprising a sliding member, an intermediately pivoted lever engaging one jaw, a lever pivoted at its extremity engaging the other jaw, both levers connected to the sliding member, and means for actuating the sliding member to open and close the grippers simultaneously.

15. In a machine for making paper bags from a bellows-fold tube, the machine having a support for the paper against which it is held while being folded; means for holding the edges of the said bellows-fold, comprising grippers, means for constraining each gripper to move in a path inclined toward the surface of the support, and means for actuating the grippers to move in such path, comprising a sliding member, an intermediately pivoted lever engaging one jaw, a lever pivoted at its extremity engaging the other jaw, both levers connected to the sliding member, the first at its extremity, the other intermediately, and means for actuating the sliding member to open and close the grippers simultaneously.

16. In a machine for making paper bags from a bellows-fold tube, the machine having a support for the paper against which it is held while being folded; means for holding the edges of the said bellows-fold, comprising grippers, means for constraining each gripper to move in a path inclined toward the surface of the support, and means for actuating the grippers to move in such path, comprising a sliding member, an intermediately pivoted lever engaging one jaw, a lever pivoted at its extremity engaging the other jaw, both levers connected to the sliding member, the first at its extremity, the other intermediately, the arm of each lever carrying the gripper being longer than its other arm, and means for actuating the sliding member to open and close the grippers simultaneously.

17. In a machine for making paper bags from a bellows-fold tube, the machine having a support for the paper against which it is held while being folded; means for holding the edges of the said bellows-fold comprising grippers, means for constraining each gripper to move in a path inclined toward the surface of the support, and means for actuating the grippers to move in such path, comprising a sliding member, an intermediately pivoted lever engaging one jaw, a lever pivoted at its extremity engaging the other jaw, both levers connected to the sliding member, and means for actuating the sliding member to open and close the grippers simultaneously, the levers being so proportioned as to move the grippers faster than the sliding member moves.

18. In a machine for making paper bags from a bellows-fold tube, the machine having a support for the paper against which it is held while being folded; means for holding the edges of the said bellows-fold, comprising sliding grippers, means for constraining each gripper to move in a path, part of which is parallel to and part of which is inclined toward the surface of the support as it approaches the lateral center of the same, and means for actuating each gripper to move in such path, comprising a sliding member, a lever pivoted intermediately on the support engaging one gripper, a lever pivoted at its extremity on the support engaging the other gripper, both levers connected to the sliding member, and means for actuating the sliding member to open and close the grippers simultaneously.

19. In a machine for making paper bags from a bellows-fold tube, the machine having a support for the paper against which it is held while being folded; means for holding the edges of the said bellows-fold, comprising sliding grippers, means for constraining each gripper to move in a path inclined toward the surface of the support as it approaches the lateral center of the same, and means for actuating the grippers to move in such paths, comprising a sliding member, a lever pivoted intermediately on the support engaging one gripper, a lever pivoted at its extremity on the support engaging the other gripper, both levers connected to the sliding member, and a cam and spring for actuating the sliding member to open and close the grippers simultaneously.

20. In a machine for making paper bags from a bellows-fold tube, the machine having a support for the paper against which it is held while being folded; means for holding the edges of the said bellows-fold comprising sliding grippers, means for constraining each gripper to move in a path inclined toward the surface of the support as it approaches the lateral center of the same, and means for actuating the grippers to move in such paths comprising a sliding member, a lever pivoted intermediately on the support engaging one gripper, a lever pivoted at its extremity on the support engaging the other gripper, both levers connected to the sliding member, and a cam and spring for actuating the sliding member to open and close the grippers simultaneously, the levers being so proportioned as to give the grippers a faster motion than has the sliding member.

21. In a machine for making bags from a bellows-fold tube of paper or similar material, having means for opening the tube to form the bag bottom, including oppositely moving supports; means for holding the edges of the bellows-folds against the supports, the holding means consisting of moving grippers mounted on the supports, means for constraining each gripper to move in a path, part of which is substantially parallel to and part of which is inclined toward the support as the lateral center of such support is approached, and a stationary cam for actuating the grippers to move in the path thus defined, whereby the grippers are closed and opened simultaneously.

22. In a machine for making bags from a bellows-fold tube of paper or similar material, having means for opening the tube to form the bag bottom, including oppositely moving supports; means for holding the edges of the bellows-fold against the supports, the holding means consisting of moving grippers mounted on the support, means for constraining each gripper to move in a path, part of which is substantially parallel to and part of which is inclined toward the support as the lateral center of such support is approached, a stationary cam and a follower, and means connecting the follower and grippers for actuating the grippers to move in the path thus defined, whereby the grippers are closed and opened simultaneously.

23. In a machine for making bags from a bellows-fold tube of paper or similar material, having means for opening the tube to form the bag bottom, including oppositely moving supports; means for holding the edges of the bellows-fold against the supports, the holding means consisting of moving grippers mounted on the supports, means for constraining each gripper to move in a path, part of which is substantially parallel to and part of which is inclined toward the support as the lateral center of such support is approached, a stationary cam and a follower, and means connecting the follower and grippers for actuating the grippers to move in the path thus defined at a speed greater than the speed of the follower, whereby the grippers are closed and opened simultaneously.

24. In a machine for making bags, having means for forming a bellows-fold tube of paper or similar material, means for cutting the same into bag lengths, and means for opening the tube to form the bag bottom, including oppositely moving supports; means for holding the edges of the bellows-fold against the supports consisting of sliding grippers, means for constraining the grippers to move in a path, part of which is parallel to and part of which is inclined toward the support as the lateral center of such support is approached, and means for actuating the sliding grippers to move in such path, whereby the grippers are closed once for each cycle of movement of the supports.

25. In a machine for making bags from a bellows-fold tube of paper or similar material, the machine having rotating opener rolls; means for holding the edges of the bellows-folds against the rolls, comprising sliding grippers, sliding rods on which they are mounted, means in the form of pins fitting in slots in the rods for constraining the sliding grippers to move in a path inclined toward the surface of the roll as the center of the roll is approached, and a stationary cam for each roll for actuating the sliding rods, whereby the grippers are closed and opened once in each revolution of the rolls.

26. In a machine for making bags from a bellows-fold tube of paper or similar material, the machine having oppositely moving supports against which the paper is held in opening the tube to form the bottom; means for holding the edges of the bellows-fold against each support, the means consisting of a sliding gripper at each side of the support, constrained to move in a path inclined toward the surface of the support, another sliding member on each support, a lever mounted intermediately of its length on one support, one extremity of the lever engaging one sliding gripper, the other engaging the sliding member, another lever engaged intermediately by the sliding member, at one end by the sliding gripper and at the other end by the support, and means for moving the sliding members to open and close the grippers simultaneously.

27. In a machine for making bags from a bellows-fold tube of paper or similar material, the machine having oppositely rotating supports against which the paper is held in opening the tube to form the bottom; means for holding the edges of the bellows fold against each support, such means consisting of two sliding grippers on each support, one at each side, the grippers constrained to move in the path inclined toward the surface of the support as it approaches the lateral center of the same, another sliding member on each support, a lever pivoted intermediately of its length on the rotating support, one extremity of the lever engaging one sliding gripper and the other extremity engaging the sliding member, another lever engaged intermediately of its length by the sliding member, at one end by the sliding jaw and at the other end pivoted to a support, and means in the form of a stationary cam and spring for moving the sliding member to open and close the grippers simultaneously.

28. In a machine for making bags from a bellows-fold tube of paper or similar material, the machine having oppositely rotating supports against which the paper is held in opening the tube to form the bottom; means for holding the edges of the bellows-fold against each support, such means consisting of two sliding grippers on each support, one at each side, the grippers constrained to move in paths inclined toward the surface of the support as they approach the lateral center of the same, another sliding member on each support, a lever pivoted intermediately of its length on the rotating support, one extremity of the lever engaging one sliding gripper and the other extremity engaging the sliding member, another lever engaged intermediately of its length by the sliding member, at one end by the sliding jaw and at the other end pivoted to a support, and means in the form of a stationary cam and spring for moving the sliding member to open and close the grippers simultaneously, the arm of each lever adjacent the gripper being longer than the other arm of the same lever.

29. In a machine for making bags from a bellows-fold tube of paper or similar material, having oppositely rotating supports against which the paper is held in opening the tube to form the bottom; means for holding the edges of the bellows-fold against each support, such means consisting of sliding grippers on each support, one at each side, the grippers constrained to move in paths inclined toward the surface of the support as they approach the center of the same, another sliding member on each support, a lever pivoted intermediately of its length on the rotating support, one extremity of the lever engaging one sliding gripper and the other extremity engaging the sliding member, another lever engaged intermediately of its length by the sliding member, at one end by the sliding jaw and at the other end pivoted to the support, and means for moving the sliding member to open and close the grippers simultaneously.

30. In a machine for making bags from a bellows-fold tube of paper or similar material, having oppositely rotating supports against which the paper is held in opening the tube to form the bottom; means for holding the edges of the bellows-fold against each support, such means consisting of two sliding grippers on each support, one at each side, the grippers constrained to move in paths inclined toward the surface of the support as they approach the center of the same, another sliding member on each support, a lever pivoted intermediately of its length on the rotating support, one extremity of the lever engaging one sliding gripper and the other extremity engaging the sliding member, another lever engaged intermediately of its length by the sliding member, at one end by the sliding jaw and at the other end pivoted to the support, and means for moving the sliding member to open and close the grippers simultaneously, the arm of each lever adjacent the gripper actuated thereby being longer than the other arm of such lever.

31. In a machine for making bags from a bellows-fold tube of paper or similar material, crease defining fingers operative in the formation of the diamond fold, a rock shaft for each such finger on which the finger is mounted, a rotating shaft carrying the rock shafts, and means operating on the rock shaft as it moves with the rotating shaft to rock the rock shaft about its axis, giving the fingers an oscillating or defining motion.

32. In a machine for making bags from a paper tube, the machine having means for feeding the tube forward and means for opening the tube to form the bag bottom; supporting and defining fingers, means for revolving the latter, and means for oscillating the fingers to give them a defining motion as they revolve.

33. In a machine for making bags from paper tube, the machine having means for feeding the tube forward and means for opening the tube to form the bottom; supporting and defining fingers, means for revolving the latter continuously, and means for oscillating the fingers intermittently to give them a defining motion as they revolve.

34. In a machine for making bags from paper tube, the machine having means for feeding the tube forward and means for opening the tube to form the bag bottom; supporting and defining fingers, means for revolving the latter continuously in the vertical plane of the feed, and means for oscillating the fingers to give them a defining motion as they revolve.

35. In a machine for making bags from tube of paper or similar material, the machine having means for feeding the tube forward and means for opening the tube to form the bottom; supporting and defining fingers, means for revolving the latter, and a stationary cam and follower for oscillating the fingers to give them a defining motion as they revolve.

36. In a machine for making bags from paper tube, having means for feeding the tube forward and means for opening the tube to form the bottom; supporting and defining fingers, means for revolving the latter continuously, and means for oscillating the fingers to give them a defining motion as they revolve, such means consisting of a stationary cam for each finger, a follower connected to the finger, and means tending to maintain the follower in engagement with the cam.

37. In a machine for making paper bags from bellows-fold tube, crease defining fingers operative in the formation of the diamond fold, a rock shaft for each such finger on which the finger is mounted, a continuously rotating shaft carrying the rock shafts, and means operating on each rock shaft as it moves with the rotating shaft to oscillate the rock shaft about its longitudinal axis.

38. In a machine for making paper bags from bellows-fold tube, means for cutting the paper into bag lengths and slotting it longitudinally, means for opening the tube and means for forming a diamond fold, four crease-defining fingers operative in the formation of the diamond fold, a rock shaft for each such finger on which the finger is mounted, two continuously rotating shafts carrying the rock shafts, and means operating on each rock shaft as it moves with the rotating shaft to oscillate such rock shaft about its axis, causing the fingers to support the paper and define the creases adjacent the ends of the longitudinal cuts.

39. In a machine for making bags from paper tube, having means for opening the tube; a continuously rotating horizontal shaft extending in a direction at right angles to the length of the tube, a plurality of means on such shaft revolving therewith to engage the paper at a predetermined point during the formation of the diamond fold, and means for oscillating said means to cause it to support the edge of the paper and define a crease at such point.

40. In a machine for making bags from paper tube, having means for severing and slitting the paper longitudinally and means for opening the tube to form the bag bottom; a continuously rotating shaft extending in a direction at right angles to the length of the tube, a plurality of means on such shaft revolving therewith to engage the paper at points adjacent the ends of the slits during the formation of the diamond fold, and means for oscillating said means to cause them to support the paper and define creases adjacent the ends of the slits.

41. In a machine for making bags from tube, such machine having means for feeding and opening the tube; a pair of defining and supporting fingers, a continuously rotating shaft having its axis at right angles to the direction of feed, means for supporting the fingers on the shaft to revolve therewith, and means for oscillating the fingers as they revolve.

42. In a machine for making bags from tube, means for feeding and opening the tube, defining and supporting fingers, a rotating horizontal shaft having its axis at right angles to the direction of feed and placed in front of the opening means, means for supporting the fingers on the shaft to revolve therewith and oscillate about a radius thereof, and means for oscillating the fingers as they revolve.

43. In a machine for making bags from paper or similar tube, having means for feeding and opening the tube; four defining and supporting fingers, two continuously rotating shafts at right angles to the direction of feed, means for supporting the fingers, two on each shaft, to revolve therewith and oscillate substantially about a radius thereof, and means for oscillating the fingers as the shafts rotate.

44. In a machine for making bags from paper tube, having means for feeding and opening the tube; four defining and supporting fingers, two continuously rotating shafts at right angles to the direction of feed, four rock shafts, one for each finger, to which such finger is secured, two such rock shafts on each rotating shaft, extending radially thereof, and means for oscillating each such rock shaft as the shaft carrying it rotates.

45. In a machine for making bags from paper tube, having means for feeding and opening the tube to form the bag bottom; defining and supporting fingers, continuously rotating shafts extending horizontally at right angles to the direction of feed and in front of the opening means, means for supporting the fingers on the shafts to revolve therewith and to oscillate substantially about a radius thereof, a stationary cam and a follower, and means for bringing the follower in contact with the cam to oscillate the fingers as the shafts carrying them rotate.

46. In a machine for making bags from a continuous tube of paper or similar material, means for feeding the tube forward, means for severing the tube into bag lengths, a pair of oppositely rotating opener rolls, means for holding a portion of one side of the tube adjacent the cuts against one opener roll, a gripper on the other roll, and a radially extending member on the first roll, pointed to pierce the adjacent face of the tube and press the cut edge of the opposite side of the tube into the gripper of the other opener roll.

47. In a machine for making bags from a tube of paper or similar material, means for feeding the tube forward, means for severing the tube into bag lengths; a pair of oppositely rotating opener rolls, means for holding a portion of one side of the tube adjacent the cuts against one opener roll, a center gripper on the other roll, and a radially extending member on the first roll pointed to pierce the adjacent face of the tube and press the cut edge of the opposite side of the tube into the gripper of the other opener roll.

48. In a machine for making bags from bellows-fold tube, opening means, side grippers thereon means for constraining each gripper to move in a path, part of which is parallel to and part of which is inclined toward the surface of the rolls, springs tending to move the grippers along such path into closed position, and means for opening the grippers at the desired intervals.

49. In a machine for making bags from paper tube, means for opening the tube including defining fingers, means for moving the fingers through a circular path continuously, and means oscillating them at intervals as they revolve.

Signed by me at Baltimore, Maryland, this 3rd day of March 1913.

JOHN H. BARTLETT.

Witnesses:
EDWARD L. BASH,
THOS. MACKENZIE.